United States Patent [19]

Kadowaki

[11] Patent Number: 5,448,285
[45] Date of Patent: Sep. 5, 1995

[54] MULTI-MEDIA COMMUNICATION APPARATUS

[75] Inventor: Shuichi Kadowaki, Yokohama, Japan

[73] Assignee: Canon Kabushiki Kaisha, Tokyo, Japan

[21] Appl. No.: 212,388

[22] Filed: Mar. 14, 1994

Related U.S. Application Data

[63] Continuation of Ser. No. 811,949, Dec. 23, 1991, abandoned.

[30] Foreign Application Priority Data

Dec. 26, 1990 [JP] Japan .................. 2-414468

[51] Int. Cl.⁶ .......................................... H04N 7/14
[52] U.S. Cl. ................................. 348/14; 379/96
[58] Field of Search ............... 348/13, 14, 15, 16; 379/96, 98, 97, 94, 93; H04N 7/14

[56] References Cited

U.S. PATENT DOCUMENTS

| | | | |
|---|---|---|---|
| 4,516,156 | 5/1985 | Fabris et al. | 358/85 |
| 4,650,929 | 3/1987 | Boerger et al. | 358/86 |
| 4,943,994 | 7/1990 | Ohtsuka et al. | 358/85 |
| 5,008,926 | 4/1991 | Misholi | 379/96 |
| 5,018,186 | 5/1991 | Kimura et al. | 358/343 |
| 5,050,009 | 9/1991 | Takahashi et al. | 358/343 |

FOREIGN PATENT DOCUMENTS 0193681 8/1988 Japan .................. 379/53

*Primary Examiner*—Curtis Kuntz
*Assistant Examiner*—Stella L. Woo
*Attorney, Agent, or Firm*—Fizpatrick, Cella, Harper & Scinto

[57] ABSTRACT

A multi-media communication apparatus capable of communicating image and voice signals through a communication line, includes a storage unit for storing data sent from a communication apparatus of a first party during a communication with the communication apparatus of the first party, and a transmission unit for transmitting data stored in the storage unit to a communication apparatus of a second party during a communication with the communication apparatus of the second party.

4 Claims, 4 Drawing Sheets

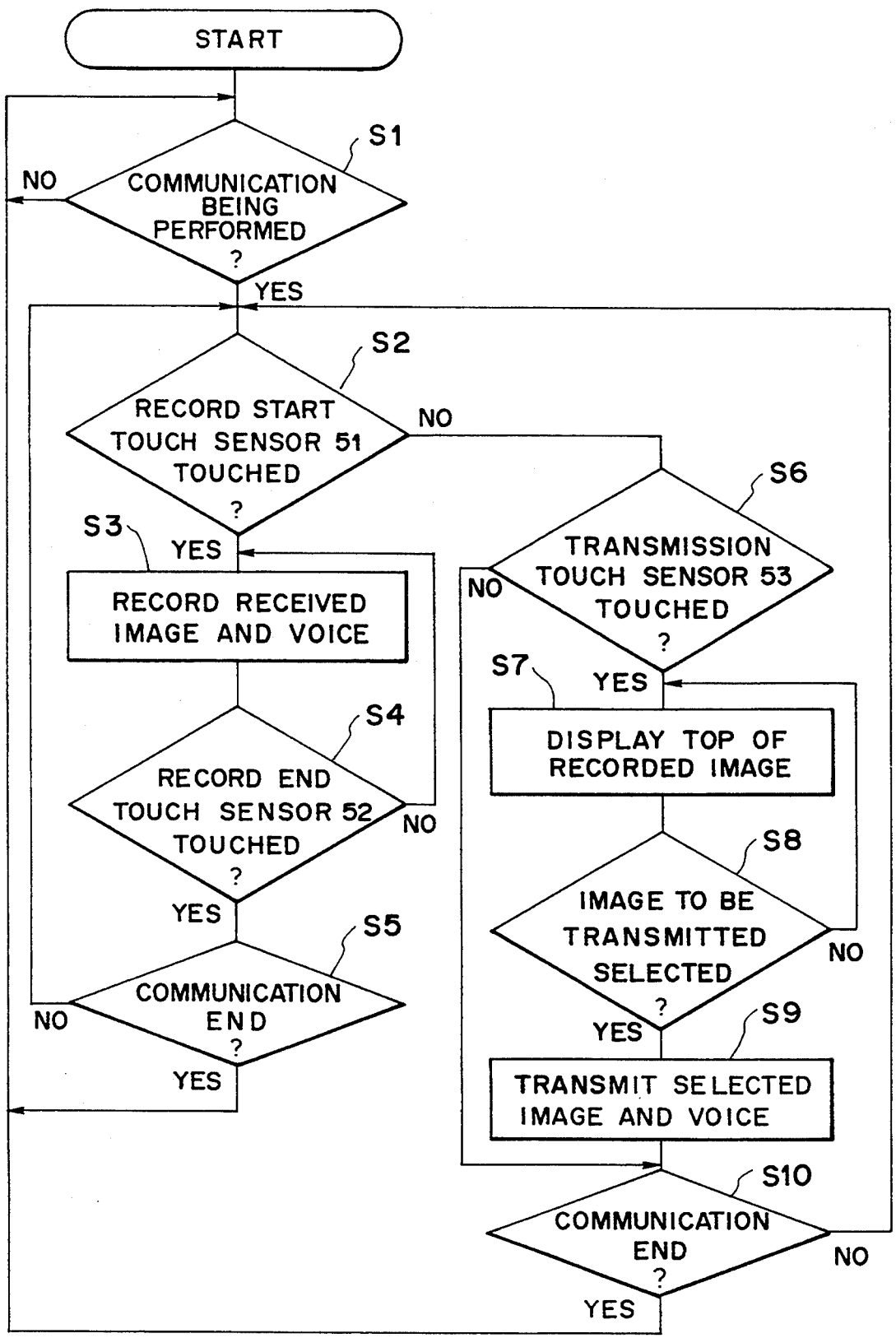

MULTI-MEDIA COMMUNICATION APPARATUS

This application is a continuation of application Ser. No. 07/811,949 filed Dec. 23, 1991, now abandoned.

BACKGROUND OF THE INVENTION

1. Field of the Invention

The present invention relates to a multi-media communication apparatus for transmitting an image signal and a voice signal through a communication line.

2. Related Background Art

Conventionally, multi-media communication apparatuses capable of performing speech and image communications are known. The present applicant has filed, as inventions associated with multi-media communications, U.S. patent application Ser. No. 628,178, U.S. patent application Ser. No. 668,897, U.S. patent application based on Japanese Patent Application Nos. 2-236848 and 3-128360, U.S. patent application Ser. No. 758,697, and U.S. patent application based on Japanese Patent Application Nos. 2-251195 and 2-414513.

In a conventional multi-media communication apparatus, when an explanation that was given to an operator with an image or voice by a first party during a communication with the first party is to be given to a second party during a communication with the second party, the operator forms an image like in an explanation to the operator by the first party, and talks according to the image, thus explaining the matter to the second party.

More specifically, in the conventional multi-media communication apparatus, when a reception content received from the first party is to be transmitted to the second party, the operator must remember an image received from the first party, and displayed on a screen, and must create the image by himself or herself. The operator must then cause the apparatus to read the image, and must give the same oral explanation to the second party according to the image, resulting in cumbersome operations.

SUMMARY OF THE INVENTION

The present invention been made to eliminate the above-mentioned conventional drawbacks, and has as its object to provide a multi-media communication apparatus capable of easily communicating a receptions-content received from a first party to a second party.

It is another object of the present invention to provide a multi-media communication apparatus, which can store received data and can transmit stored data with simple operations using a touch panel.

The above and other objects of the present invention will become apparent from the accompanying drawings, and the detailed description taken in conjunction with the accompanying drawings.

BRIEF DESCRIPTION OF THE DRAWINGS

FIG. 5 is a flow chart showing an operation of the multi-media communication apparatus of this embodiment.

DETAILED DESCRIPTION OF THE PREFERRED EMBODIMENTS

Figure 3:
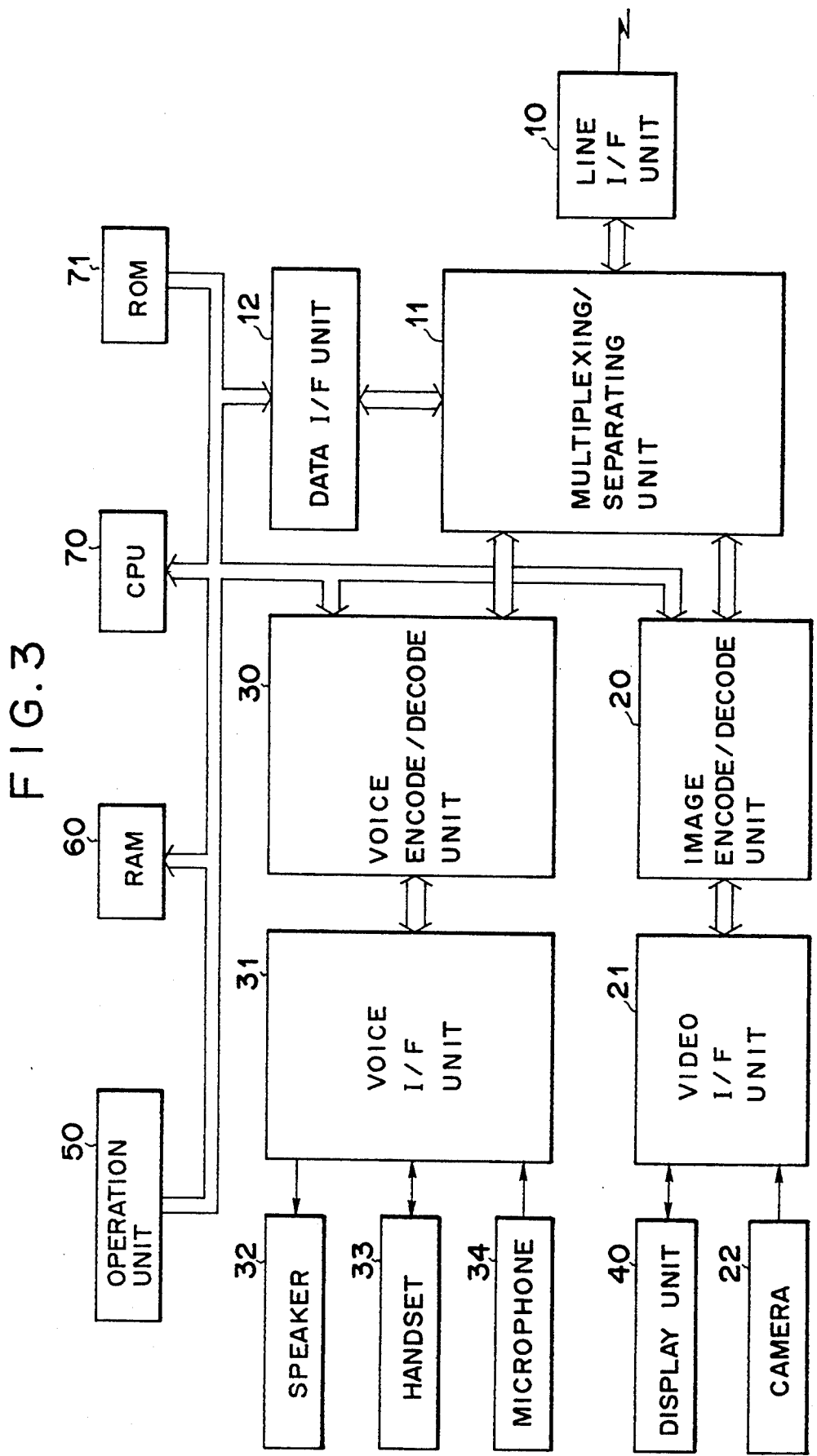
FIG. 3 is a block diagram showing an arrangement of the multi-media communication apparatus.
Figure 4:
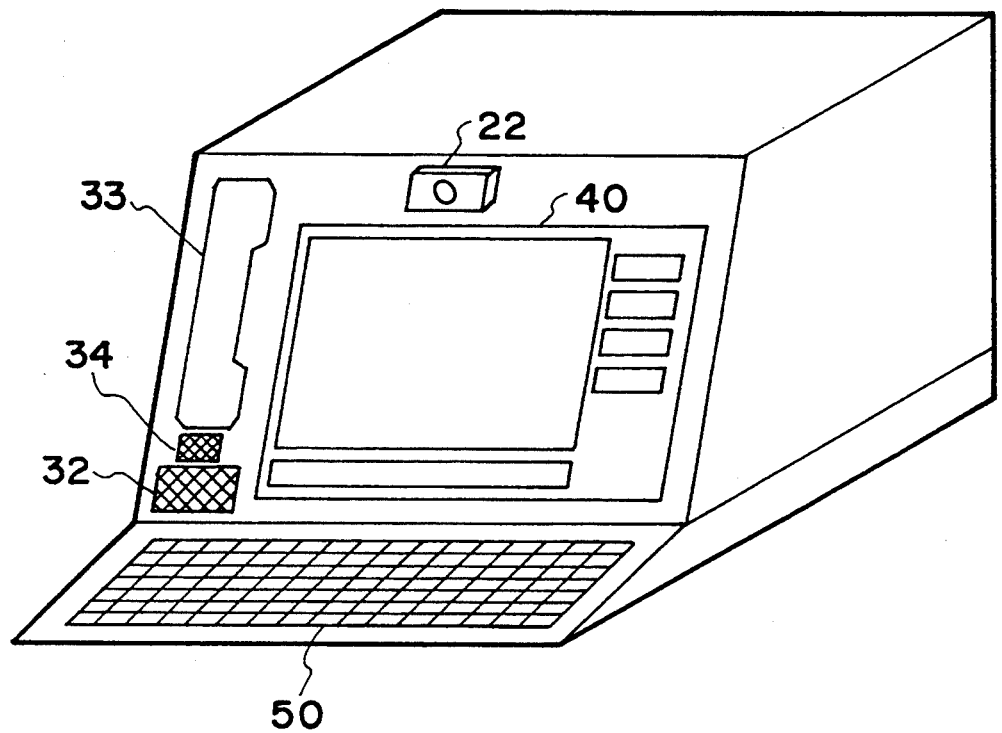
FIG. 4 is a perspective view of the multi-media communication apparatus.

FIG. 3 is a block diagram showing the arrangement of a multi-media communication apparatus according to an embodiment of the present invention. FIG. 4 is a perspective view of the multi-media communication apparatus.

In FIG. 3, a multiplexing/separating unit 11 separates a signal received by a line I/F (interface) unit 10, and multiplexes an image signal and a voice signal to be transmitted to a given party. A data I/F (interface) unit 12 exchanges data signals associated with connection control of a line.

An image encode/decode unit 20 decodes an image signal separated by the multiplexing/separating unit 11, and encodes an image signal to be transmitted to a given party. A video I/F (interface) unit 21 exchanges image signals.

A voice encode/decode unit 30 decodes a voice signal separated by the multiplexing/separating unit 11, and encodes a voice signal to be transmitted to a given party. A voice I/F (interface) unit 31 exchanges voice signals.

A display unit 40 displays an image according to an image signal received by the video I/F unit 21. An operation unit 50 comprises a keyboard and touch sensors. A RAM 60 is a memory for storing an image signal decoded by the image decode/encode unit 20. A CPU 70 controls the respective units of the multi-media communication apparatus. A ROM 71 is a memory for storing a program for operating the CPU 70.

In addition, the multi-media communication apparatus comprises a camera 22, a speaker 32, a handset 33, and a microphone 34.

Figure 1:
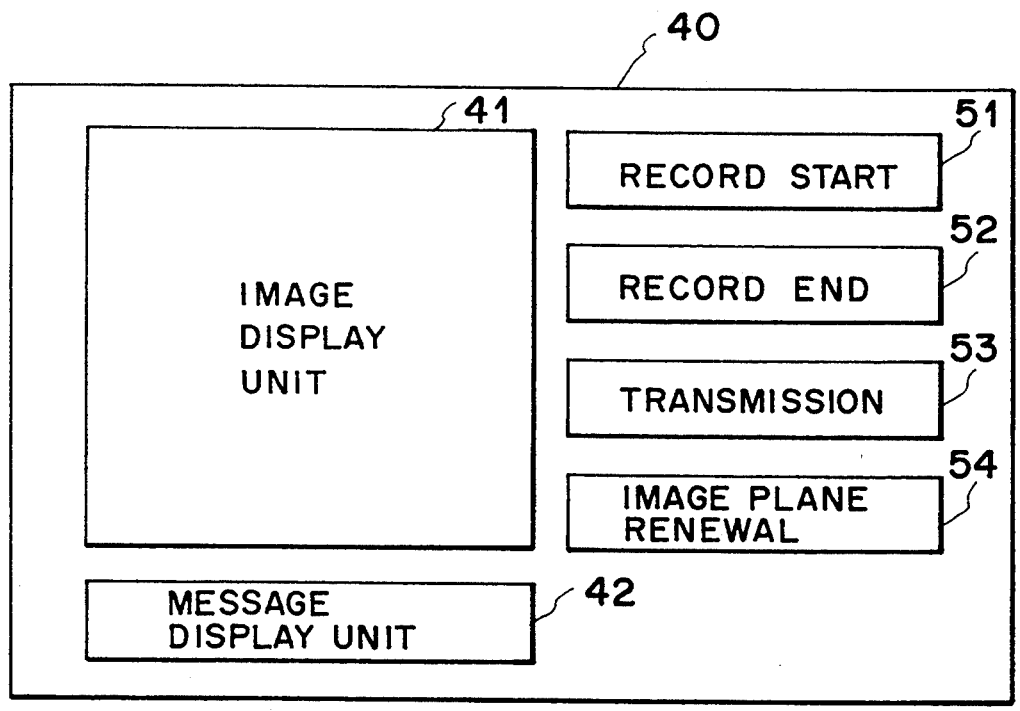
FIG. 1 is a front view showing in detail a display unit 40 of a multi-media communication apparatus according to an embodiment of the present invention.

FIG. 1 is a front view showing in detail the display unit 40 of this embodiment.

Figure 2:
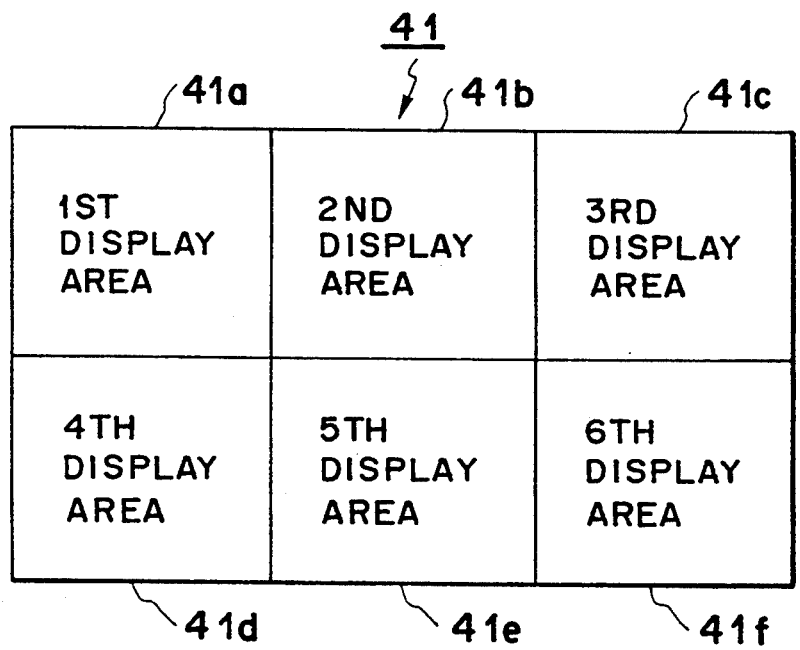
FIG. 2 is a view showing in detail an image display section 41 in the multi-media communication apparatus.

The display unit 40 has an image display section 41 for displaying an image received from a first party, and a message display section 42 for displaying a message such as an error message. The image display section 41 is equally divided into six areas, i.e., a first display area 41a, a second display area 41b, a third display area 41c, ..., a sixth display area 41f, as shown in FIG. 2, and these display areas respectively serve as touch areas of the touch sensors.

The operation unit 50 comprises a record start touch sensor 51, a record end touch sensor 52, a transmission touch sensor 53, and an image plane renewal touch sensor 54, which are arranged on the display unit 40.

The record start touch sensor 51 is a touch sensor touched to start a recording operation of an image signal and a voice signal received from the first party. The record end touch sensor 52 is a touch sensor touched when the record operation of the image signal and the voice signal received from the first party is ended.

The transmission touch sensor 53 is a touch sensor touched when the image signal and the voice signal recorded in the RAM 60 are to be transmitted. The image display section 41 and the transmission touch sensor 53 constitute transmission means for transmitting the image signal and the voice signal received from the first party to a second party during a communication with the second party. For example, when an image displayed on the image display area 41b is to be transmitted to the second party, the transmission touch sensor 53 is depressed, and thereafter, the second display area 41b of the image display section 41 need only be touched.

The image plane renewal touch sensor 54 is a touch sensor touched when the image plane of the image display section 41 is renewed.

The RAM 60 also serves as a memory for storing a voice signal decoded by the voice encode/decode unit 30. The record start touch sensor 51, the record end touch sensor 52, and the RAM 60 constitute record means for recording an image signal and a voice signal received from the first party.

The CPU 70 checks if the touch sensors 51, 52, 53, and 54, and the image display section 41 are touched, and checks, upon reception of an incoming call signal from a given party, if a response is made to the incoming call signal.

The operation of this embodiment will be described below.

FIG. 5 is a flow chart showing an operation of the embodiment.

In the following description, assume that an operator communicates with the first party, and then, communicates with the second party different from the first party. The CPU 70 determines that the multi-media communication apparatus of this embodiment is communicating with the first party (S1). If the CPU 70 determines that the record start touch sensor 51 is touched (S2), a pair of an image signal and a voice signal received from the first party are recorded in the RAM 60 (S3). More specifically, the multiplexing/separating unit 11 separates a signal received by the line I/F unit 10. The separated image signal is decoded by the image encode/decode unit 20, and the CPU 70 stores the decoded image signal in the RAM 60. At this time, a telephone number of the calling party is stored as a selection signal in the RAM 60 in correspondence with the received image signal. On the other hand, a voice signal separated by the multiplexing/separating unit 11 is decoded by the voice encode/decode unit 30, and the CPU 70 stores the decoded voice signal in the RAM 60. In this manner, the image and voice signals received from the first party are stored in the RAM 60.

In order to end the record operation of the image and voice signals received from the first party, an operator touches the record end touch sensor 52. If the CPU 70 determines that the record end touch sensor 52 is touched (S4), the record operation of the received image and voice signals is ended. Thereafter, a communication is ended (S5).

An operation when the image and voice signals recorded in the RAM 60 are transmitted to the second communicating party during a communication with the second party will be described below.

An operator touches the transmission touch sensor 53 (S6), and tops of images stored in the RAM 60 (a plurality of pages of images are stored as motion pictures for each case in the RAM 60), and telephone numbers of calling parties according to the selection numbers are displayed in turn on the first display area 41a, the second display area 41b, the third display area 41c, . . . , the sixth display area 41f of the image display section 41 (S7). At this time, if the CPU 70 determines that the image plane renewal touch sensor 54 is touched, the image plane of the image display section 41 is renewed.

When seven cases of image signals, voice signals, and telephone numbers of calling parties are stored in the RAM 60, after an operator touches the transmission touch sensor 53, the first six cases of images and telephone numbers are displayed in turn from the first display area 41a to the sixth display area 41f. After the operator touches the image plane renewal touch sensor 54, the image plane of the image display section 41 is renewed to erase the first case of the image and the telephone number displayed on the first display area 41a, and to display the seventh case of the image and the telephone number on the first display area 41a. The second to sixth cases of images and telephone numbers are displayed without being erased.

After the tops of images and the telephone numbers recorded in the RAM 60 are displayed on the image display section 41, the operator touches one of the display areas of the image display section 41 (S8) so as to select the image and voice signals to be transmitted to the second communicating party, and the selected image and voice signals are transmitted to the second party (S9). When image and voice signals different from the transmitted image and voice signals are to be transmitted after the selected image and voice signals are transmitted, the operator touches the transmission touch sensor 53. If the CPU 70 determines that the transmission touch sensor 53 is touched, the top images of images, which are recorded in the RAM 60 and are not transmitted yet, are displayed on the image display section (S6, S7). Thereafter, of the display areas of the image display section 41, the image and voice signals of the display area selected by the operator are transmitted to the second party.

As described above, image and voice signals received from the first party are recorded in the RAM 60, and the recorded image and voice signals are transmitted to the second party. Therefore, the reception content received from the first party can be easily transmitted to the second party.

Note that the same applies to a case wherein image and voice signals received from the first party and recorded in the RAM 60 are to be transmitted to the second, third, . . . , nth parties.

The received image and voice signals may be stored in other recording media such as a magnetic disk, a magnetic tape, an optical disk, an optomagnetic disk, and the like in place of the RAM 60.

Image and voice signals received from the first party, and image and voice signals transmitted to the first party, i.e., transmission/reception contents during a communication with the first party, may be recorded in the RAM 60, and the recorded transmission/reception contents may be transmitted to the second party. Alternatively, when the transmission/reception contents recorded in the RAM 60 are transmitted to the second party, the image and voice signals received from the first party may be transmitted, and thereafter, the image and voice signals transmitted to the first party may be transmitted to the second party.

As described above, according to the present invention, the reception content received from the first party can be easily transmitted to the second party with simple operations, i.e., by touching the display panel.

The preferred embodiment of the present invention has been described. However, the present invention is not limited to the above embodiment, and various changes and modifications may be made within the scope of claims.

What is claimed is:

1. A communication apparatus comprising:

communication means capable of performing data communications;

storage means for storing data communicated by said communication means;

first selection means for selecting a communication of the data stored in said storage means;

display means for displaying a plurality of the data stored in said storage means;

second selection means for selecting one of the plurality of data displayed on said display means; and control means for causing said storage means to be able to perform a data storage operation and causing said first and second selection means to be able to perform selection operations, during a communication operation by said communication means, wherein said storage means stores the data communicated by said communication means if the storage operation is selected, during a communication with a communication apparatus of a first party, said display means displays the plurality of data stored in said storage means, during a communication to a communication apparatus of a second party, thereafter, said communication means transmits the data selected by said second selection means to the communication apparatus of the second party, and said display means displays the data other than the selected data from among the plurality of data stored in said storage means, if the data communication is again selected by said first selection means after the transmission of the selected data.

2. An apparatus according to claim 1, wherein said second selection means selects an image, touched by an operator, from a plurality of images displayed on said display means.

3. An apparatus according to claim 1, wherein said storage means comprises a storage start switch for instructing start of a data storage operation, and a storage end switch for instructing end of the storage operation, and said storage start and end switches comprise touch sensors.

4. A communication method comprising:

a communication step capable of performing data communications;

a storage step of storing data communicated in said communication step;

a first selection step of selecting a communication of the data stored in said storage step;

a display step of displaying a plurality of the data stored in said storage step;

a second selection step of selecting one of the plurality of data displayed in said display step; and a control step of causing said storage step to be able to perform the data storage operation and causing said first and second selecting steps to be able to perform the selection operations, during the communication operation in said communication step, wherein, in said storage step, the data communicated in said communication step is stored if the storage operation is selected, during a communication with a communication apparatus of a first party, in said display step the plurality of the data stored in said storage step are displayed, during a communication to a communication apparatus of a second party, thereafter, in said communication step the data selected in said second selection step is transmitted to the communication apparatus of the second party, and in said display step the data other than the selected data from among the data stored in said storage step are displayed, if the data communication is again selected in said first selection step after the transmission of the selected data.

* * * * *

UNITED STATES PATENT AND TRADEMARK OFFICE
CERTIFICATE OF CORRECTION

PATENT NO. : 5,448,285
DATED : September 5, 1995
INVENTOR(S) : SHUICHI KADOWAKI

It is certified that error appears in the above-identified patent and that said Letters Patent is hereby corrected as shown below:

COLUMN 1

Line 44, "been" should read --has been--.
Line 47, "receptions-" should read --reception--.

COLUMN 2

Line 5, "EMBODOMENTS" should read --EMBODIMENT--.

Signed and Sealed this

Twentieth Day of February, 1996

Attest:

BRUCE LEHMAN

*Attesting Officer*   *Commissioner of Patents and Trademarks*